Sept. 25, 1945.　　　　F. A. ENDRESS　　　　2,385,407
PACKING BOX FOR THE HEAT TREATMENT OF FERROUS MATERIAL
Filed May 6, 1942
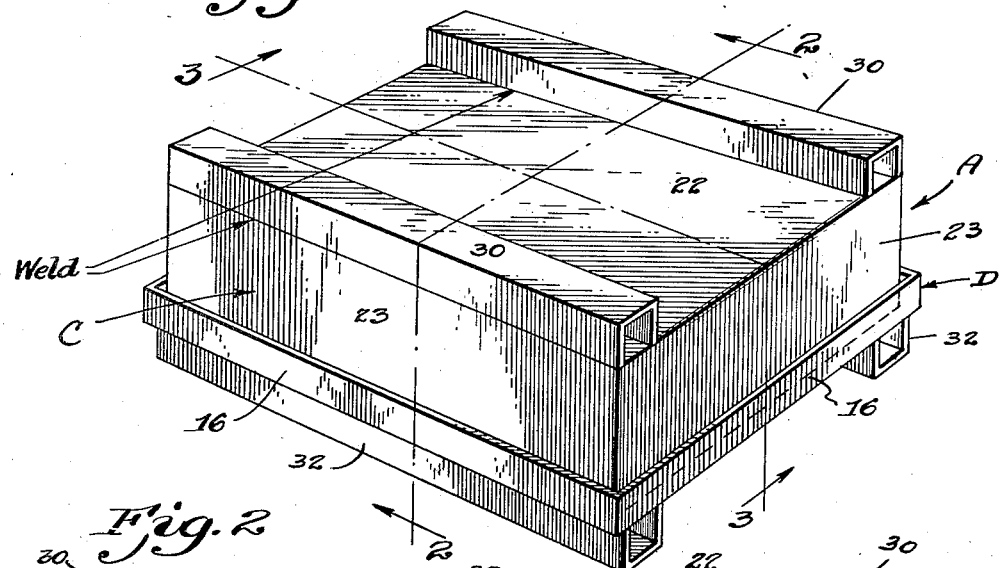
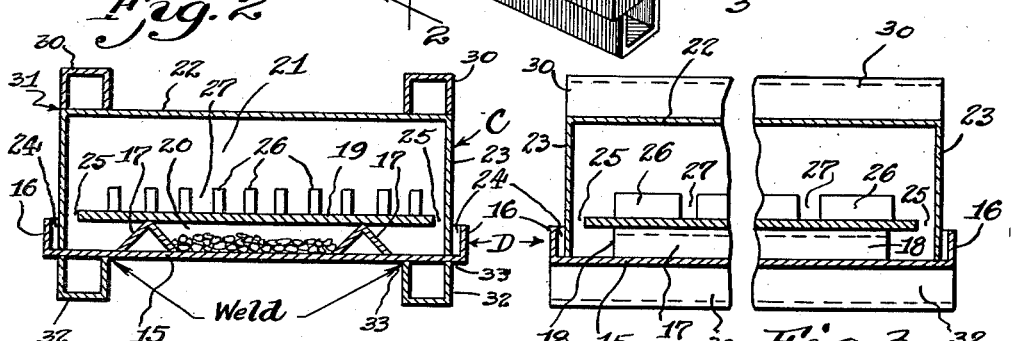
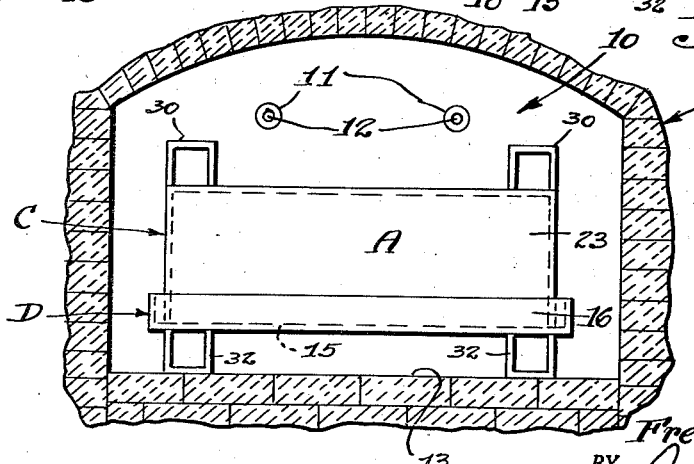
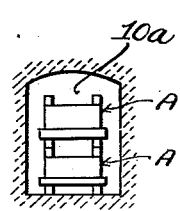
INVENTOR.
Frederick A. Endress
BY
Attorney Patented Sept. 25, 1945

2,385,407

UNITED STATES PATENT OFFICE 2,385,407

PACKING BOX FOR THE HEAT-TREATMENT OF FERROUS MATERIAL

Frederick A. Endress, Detroit, Mich., assignor to Tuff-Hard Corporation, Detroit, Mich., a corporation of Michigan Application May 6, 1942, Serial No. 441,928

3 Claims. (Cl. 266—5)

My invention relates to packing boxes used primarily for the heat treatment of ferrous materials and more particularly for toughening and hardening ferrous materials such as high speed steel tools and the like within a furnace by radiant heat.

In the heat treatment of ferrous materials particularly high speed steel tools and other ferrous products or work pieces it has been found to be advantageous to shield the work from direct or convection heat and to seal the work to be heat treated and supply a carbonaceous atmosphere for the protection of the surface of the work. This has heretofore been accomplished by taking great care to seal the work within a heat treating box and such operations entail considerable time and expense.

An object of my present invention is to overcome the difficulties aforesaid by providing a fabricated box structure comprising separable box sections in which the ferrous material to be heat treated may be readily stored and the box with the material stored therein subjected to various processing operations in a directly heated or a semi-muffled furnace with improved economy.

Another object of my present invention is to construct a heat treating box structure for the heat treatment of ferrous materials by radiant heat preferably in a directly heated or a semi-muffled furnace by providing a box structure composed of separable box sections which when assembled cooperate to provide a tortuous channel surrounding the box structure whereby to provide means tending to eliminate leakage of external atmosphere into the chamber containing the ferrous material being heat treated.

Further objects of my present invention are to economically construct a heat treating box for use with the heat treatment of ferrous materials such as high speed steel tools and other similar products by providing a structure which includes structural features facilitating the economical assembly with a minimum of time and expense, and which is provided with means which facilitate the handling of the box structure and the separable box portions which compose said box structure.

For a more detailed understanding of my invention reference may be had to the accompanying drawing illustrating a preferred embodiment of my invention in which like parts are referred to by like characters throughout the several views and in which:

Fig. 1 is a perspective view of the packing box for the heat treatment of ferrous materials and embodying the principles of my inventions, Fig. 2 is a transverse sectional view thereof taken substantially on the line 2—2 of Fig. 1 and showing the relationship between the separable box sections which together define a closed chamber and the work supporting means within said chamber, Fig. 3 is a longitudinal sectional view of the packing box aforesaid which view is taken substantially on the lines 3—3 of Fig. 1, Fig. 4 is a fragmentary sectional view taken transversely through a heat treating furnace and showing my improved heat treating box in elevation within the furnace retort, and Fig. 5 is a fragmentary sectional view showing a stack of heat treating boxes in a furnace retort of modified construction.

The packing box A which embodies the principles of my invention is constructed for easy handling and for placing in a furnace B having a retort 10. The furnace retort may be heated by any suitable means and I have illustrated one preferred type consisting of burners 11 which extend into the furnace retort and which carry nozzles and jets through which oil or any other combustible fluid may be injected into said retort and ignited. The packing box in which the ferrous material being heat treated is contained, is constructed to fit into the furnace retort the same resting on the floor 13 of the retort. The packing boxes herein illustrated may if desired be stacked up within a furnace retort 10a as shown in Fig. 5. Likewise it will be noted that the construction of these boxes facilitates the stacking of same whenever necessary to do so and while so stacked it will be noticed that same may be readily handled and moved about with a minimum of time and labor.

The heat treating box per se is composed of separable box like sections "C" and "D" hereafter referred to more specifically as upper and lower sections respectively. The lower box like section is provided with a floor or bottom portion 15 and upwardly extending side walls 16. The lower section carries a work support preferably consisting of inverted V-shaped channels 17 extending longitudinally of the packing box but having end portions 18 which terminate a material distance from the walls 16 which define the front and rear ends of the box section. A work plate 19 is removably supported on these channels in spaced relation with respect to the bottom 15 of the lower box section and cooperates with the channels 17 to define a compartment 20 disposed beneath the work plate which is open at both ends to the work chamber 21. The upper box section C consists of a top wall 22 with downwardly extending walls 23 hich are telescopically assembled inside the upwardly extending walls 16 of the lower box section D but preferably spaced therefrom as at 24.

It will be observed that these two separable box sections cooperate to define or provide a substantially closed work chamber 21, which chamber is substantially sealed off from the atmosphere surrounding the box.

The construction of this packing box and the separable sections of which it is composed in conjunction with the work supports is such as to support the work within the chamber 21 so that same is subjected substantially only to radiant heat when the box and its contents are inserted into a furnace such as is illustrated in Figs. 4 and 5. A minimum of such heat is conducted to the work directly by conduction because of the minimum of contact area between the work plate 19 and the channel supports 17. Due to the fact that the chamber is substantially closed there is a minimum of convection currents conducting heat to the material being heat treated, and preferably there shall be no direct impingement of any convection gases on the material being treated. The clearance around the peripherial edge of the work plate designated 25 forms a restricted opening by which the gases are expanded and diffused in the chamber over the work and direct impingement of the gases against the work is prevented.

The work plate is constructed of pure iron and it has been found that a pure iron work plate reduces the reaction between the carbonaceous gases in the box and the work being heat treated in repeatedly using said box in the heat treatment of ferrous materials such as high speed tool steel.

It will be observed that the space 24 between the side walls 23 and 16 of the upper and lower box sections respectively define an annular pocket surrounding and closely adjacent to the contacting portions of the upper and lower box sections, the atmosphere contained within this annular pocket being substantially quiescent and noncirculating and same therefore acts to seal the chamber and tends to prevent leakage of the external atmosphere into said chamber. Furthermore, it will be observed that the supporting means for the work plate and the work plate itself cooperate with the vertical walls of the upper section in such a way as to make it necessary for any of the atmosphere which might leak into the box having to rise in the box and pass between the narrow or restricted opening 25 between the work plate and the walls 23 of the upper section and is expanded and disbursed thereby through the chamber above the work before same can come into direct contact with the material being heat treated. For convenience I have illustrated diagrammatically tool bits of conventional design supported on the work plate 19, these tool bits being designated by reference characters 26. Preferably the products which are being heat treated, are suitably spaced from each other as at 27 so as to expose a maximum of surface of the work to the radiant heat thereby facilitating the penetration of heat to the work in a minimum of time. It will be observed that the pocket 24 together with the space 25, form a tortuous channel around the chamber 21 and actual practice has demonstrated that this means effectively prevents the leakage of the atmosphere of the furnace retort 10 from entering the chamber 21 and contacting with or directly impinging the ferrous material or other work pieces being heat treated.

It is advantageous in the heat treatment of ferrous materials particularly high speed and tool steels to provide a source of carbon within the packing box so that when same is subjected to heat, carbonizing gases escape from this carbon and penetrate the work. In the present construction this carbonaceous material utilized in the same way and for the purpose specified, is placed within the compartment 20 as specifically illustrated in Fig. 2. It will be seen that the gases generated in this carbon or other material is free to circulate in the chamber 21 in contact with the work pieces 26 because the compartment 20 is in open communication with the chamber principally at the front and back end thereof.

To facilitate handling of the packing box and the handling of the separable sections longitudinally extending U-shaped channels 30 are secured to the external surface of the top wall of the upper section C as at 31. Preferably these channels 30 are welded to the upper section but obviously any suitable means may be employed for securing same thereto. The lower box section D is also provided with longitudinally extending channels 32 which are welded or otherwise suitably secured to the external surface of the bottom wall 15 of this section as at 33. It will be noted that these channels 30 and 32 are substantially identical in dimension and they are preferably equally spaced transversely of the packing box so that the operator may readily handle same with the use of the same tool such as a fork customarily used for inserting and withdrawing such boxes to and from a furnace retort. These channels provide a support for said boxes when placed in a furnace, which is sufficiently wide to minimize abrasive action of the box on the ceramic floor of the furnace chamber.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. A packing box structure for the heat treatment of ferrous materials comprising separable complementary box sections, each of said sections having longitudinally extending fork receiving tunnels secured along a longitudinal external corner edge, said tunnels of both box sections substantially equally transversely spaced.

2. A packing box structure for the heat treatment of ferrous materials comprising separable complementary upper and lower box sections, a plurality of longitudinally extending fork receiving tunnel members carried by said upper section and secured externally to the top wall thereof, and a plurality of longitudinally extending fork receiving tunnel members carried by said lower section and secured externally to the bottom wall thereof, the transverse spacing between the tunnel members of said upper section being substantially the same as the transverse spacing between the tunnel members of the lower section whereby to facilitate stacking of said box structure and to facilitate manual handling of said box structure and the individual sections by means of the same handling means as well as facilitating circulation by convection heat between said boxes when stacked in the furnace.

3. In a heat treating box of the class wherein a pair of vertically separable box sections cooperate to provide a work receiving chamber therebetween substantially sealed from the surrounding atmosphere, the combination with said sections of means fixed with respect to each thereof forming a pair of parallel fork receiving tunnels, the tunnels formed by said means on one of said sections being spaced laterally from each other by a distance corresponding to the tunnels formed by said means on the other of said sections whereby the same fork may be received by the tunnels of both said sections, said means projecting below the plane of the lower wall of the lower of said sections and above the upper wall of the upper of said sections and having substantially flat, horizontally directed faces, whereby in stacking a plurality of said boxes, one upon another, one box may be supported upon another in generally vertically spaced relation thereto solely through interengagement of said tunnel forming members on the opposed walls of said boxes.

FREDERICK A. ENDRESS.